United States Patent
Jeon et al.

(10) Patent No.: US 8,355,599 B2
(45) Date of Patent: Jan. 15, 2013

(54) METHODS AND DEVICES FOR DETECTING CHANGES IN BACKGROUND OF IMAGES USING MULTIPLE BINARY IMAGES THEREOF AND HOUGH TRANSFORMATION

(75) Inventors: Jae Wook Jeon, Suwon (KR); Sang Jun Lee, Suwon (KR); Xuan Dai Pham, Suwon (KR); Seung Hun Jin, Suwon (KR); Dong Kyun Kim, Suwon (KR); Ki Hoon Kim, Suwon (KR); Jung Uk Cho, Suwon (KR)

(73) Assignee: Sungkyunkwan University Foundation for Corporate Collaboration, Gyeonggi-do (KR)

( * ) Notice: Subject to any disclaimer, the term of this patent is extended or adjusted under 35 U.S.C. 154(b) by 778 days.

(21) Appl. No.: 12/468,863

(22) Filed: May 19, 2009

(65) Prior Publication Data

US 2010/0215287 A1  Aug. 26, 2010

(30) Foreign Application Priority Data

Feb. 20, 2009  (KR) ........................ 10-2009-0014300

(51) Int. Cl.
*G06K 9/36* (2006.01)
(52) U.S. Cl. ........ 382/281; 348/586; 382/103; 382/199; 382/224; 382/257
(58) Field of Classification Search ........................ None
See application file for complete search history.

(56) References Cited

U.S. PATENT DOCUMENTS

| | | | |
|---|---|---|---|
| 5,034,986 A * | 7/1991 | Karmann et al. | 382/103 |
| 5,764,306 A * | 6/1998 | Steffano | 348/586 |
| 6,606,412 B1 * | 8/2003 | Echigo et al. | 382/224 |
| 6,771,834 B1 * | 8/2004 | Martins et al. | 382/257 |
| 7,003,160 B2 * | 2/2006 | Horie | 382/199 |
| 2003/0059117 A1 * | 3/2003 | Iwasa et al. | 382/224 |
| 2008/0273755 A1 * | 11/2008 | Hildreth | 382/103 |
| 2008/0313172 A1 * | 12/2008 | King et al. | 707/5 |

OTHER PUBLICATIONS

ICRA 2008 official site page, for 2008 IEEE Int'l Conf. on Robotics and Automation, Pasadena, CA May 19-23, 2008.
ICRA 2008 Acceptance Letter to X. Pham, Mar. 26, 2009, Sungkyunkwan University, for scheduled presentation on May 22, 2008.
Pham et al., "Background Compensation Using Hough Transformation", 978-1-4244-1647-9/08 IEEE, Int'l Conf. on Robotics and Automation, Pasadena, CA.
Table of Contents, p. 40/67, May 4, 2009, listing *Background Compensation Using Hough Transformation* pp. 2392-2397, ThC5.4, file:///H:/data/toc.htm.

* cited by examiner

*Primary Examiner* — Tsung-Yin Tsai
(74) *Attorney, Agent, or Firm* — Martine Penilla Group, LLP.

(57) ABSTRACT

The invention relates to a device and method for detecting changes in background of successive images. More particularly, the invention relates to a device and method for detecting changes in background of successive images by obtaining vertically accumulated values and horizontally accumulated values from multiple binary images of previous image and current image, obtaining pairs of rows and pairs of columns based on the vertically accumulated values and horizontally accumulated values, and transforming pairs of rows and pairs of columns using Hough transformation.

Also, the invention relates to an interface system including background changes detecting device and display device connected to the background changes detecting device.

22 Claims, 17 Drawing Sheets

METHODS AND DEVICES FOR DETECTING CHANGES IN BACKGROUND OF IMAGES USING MULTIPLE BINARY IMAGES THEREOF AND HOUGH TRANSFORMATION

CROSS-REFERENCE TO RELATED APPLICATION

The present application is claiming priority of Korean Patent Application No. 10-2009-0014300, filed on Feb. 20, 2009, the content of which is incorporated herein by reference.

BACKGROUND OF THE INVENTION

1. Field of the Invention

The invention relates to devices and methods for detecting changes in background of successive images. More particularly, the invention relates to devices and methods for detecting changes in background of successive images by obtaining vertically accumulated values and horizontally accumulated values using multiple binary images of previous image and current image, obtaining pairs of rows and pairs of columns based on the vertically accumulated values and horizontally accumulated values, and transforming pairs of rows and pairs of columns using Hough transformation.

Also, the invention relates to an interface system including background changes detecting device and display device connected to the background changes detecting device.

2. Description of the Related Art

Vision technology for analyzing images, recognizing necessary information and using the recognized information has various applicable fields. One of the things frequently mentioned in the vision technology is to sense movements in images. As the method of sensing movements in images, there are a method of sensing movements in images based on images inputted from fixed camera and a method of sensing movements in images based on images inputted from moving camera.

Among methods of sensing movements in images, a method of sensing movements in images using difference between previous image and current image is used a lot. According to the method, at a place as far as displacement value obtained from the difference of images from original place, information similar to information obtained from original image is searched and necessary information is used while unnecessary information is removed. However, the method is sensitive to changes in input images caused by changes of pose or location of camera so that it requires a device for fixing camera. There is a disadvantage that it is hard to precisely find information on changes in input images and to apply to images changed by zoom operation.

SUMMARY OF THE INVENTION

It is, therefore, an object of the invention to provide methods and devices for precisely detecting changes in background of images despite rotation or zooming operation of image input means for receiving inputs of images such as camera.

Further, it is an object of the invention to provide interface systems comprising background changes detecting device and display device connected to the background changes detecting device. The interface systems detect changes in background of successive images and control pointing means or images displayed by the display window to move in real time in proportion to the detected changes in background.

In accordance with one aspect of the present invention, there is provided a device for detecting changes in background of images using multiple binary images thereof and Hough transformation, comprising: image input module for receiving successive inputs of gray scale images; accumulated values obtaining module for separating both previous image $I_{k-1}$ and current image $I_k$ inputted through the image input module into same number of binary images, counting the number of pixels having pixel values within certain range of pixel values, said range of pixel values being respectively assigned to each binary image, and obtaining vertically accumulated values $h_j^V(I_{k-1})$, $h_{j'}^V(I_k)$ and horizontally accumulated values $h_i^H(I_{k-1})$, $h_{i'}^H(I_k)$, said vertically accumulated values $h_j^V(I_{k-1})$, $h_{j'}^V(I_k)$ representing the total number of the counted pixels in each column of the previous image $I_{k-1}$ and current image $I_k$, said horizontally accumulated values $h_i^H(I_{k-1})$, $h_{i'}^H(I_k)$ representing the total number of the counted pixels in each row of the previous image $I_{k-1}$ and current image $I_k$; pairs obtaining module for determining effective pairs of rows (i, i') of the previous image $I_{k-1}$ and current image $I_k$ and effective pairs of columns (j, j') of the previous image $I_{k-1}$ and current image $I_k$ on the basis of the accumulated values obtained by the accumulated values obtaining module; and Hough transformation module for transforming the effective pairs using Hough transformation and determining peak values $\rho^V$, $\theta^V$, $\rho^H$, $\theta^H$, wherein changes in background of images are detected from the peak values $\rho^V$, $\theta^V$, $\rho^H$, $\theta^H$.

In accordance with another aspect of the present invention, there is provided a method for detecting changes in background of images using multiple binary images thereof and Hough transformation, comprising: receiving successive inputs of gray scale images comprising previous image $I_{k-1}$ and current image $I_k$; separating both the previous image $I_{k-1}$ and current image $I_k$ into same number of binary images, counting the number of pixels having pixel values within certain range of pixel values, said range of pixel values being respectively assigned to each binary image, and obtaining vertically accumulated values $h_j^V(I_{k-1})$, $h_{j'}^V(I_k)$ and horizontally accumulated values $h_i^H(I_{k-1})$, $h_{i'}^H(I_k)$, said vertically accumulated values $h_j^V(I_{k-1})$, $h_{j'}^V(I_k)$ representing the total number of the counted pixels in each column of the previous image $I_{k-1}$ and current image $I_k$, said horizontally accumulated values $h_i^H(I_{k-1})$, $h_{i'}^H(I_k)$ representing the total number of the counted pixels in each row of the previous image $I_{k-1}$ and current image $I_k$; obtaining effective pairs of rows (i, i') of the previous image $I_{k-1}$ and current image $I_k$ and effective pairs of columns (j, j') of the previous image $I_{k-1}$ and current image $I_k$ on the basis of the accumulated values; and transforming the effective pairs using Hough transformation and determining peak values $\rho^V$, $\theta^V$, $\rho^H$, $\theta^H$, wherein the changes in background of the images are detected from the peak values $\rho^V$, $\theta^V$, $\rho^H$, $\theta^H$.

Preferably, the detected changes in background of images may be determined by $a_{11}$, $a_{22}$, $b_1$, $b_2$ of the following equation.

$$A\begin{pmatrix}x\\y\end{pmatrix} + B = \begin{pmatrix}x'\\y'\end{pmatrix},$$

$$A = \begin{pmatrix}a_{11} & 0\\0 & a_{22}\end{pmatrix}$$

$$B = \begin{pmatrix}b_1\\b_2\end{pmatrix}$$

$$a_{11} > 0,\ a_{22} > 0$$

Where (x, y) denotes a point in the previous image $I_{k-1}$ and (x', y') denotes a corresponding point in the current image $I_k$.

Preferably, the accumulated values obtaining module may obtain vertically accumulated values $h_j^V(I_{k-1})$, $h_{j'}^V(I_k)$ and horizontally accumulated values $h_i^H(I_{k-1})$, $h_i^H(I_k)$ by counting the total number of pixels having pixel values within a range between number $$\frac{255l}{N} \text{ and } \frac{255(l+1)}{N},$$

and N and N binary images $I_{k-1}^l$, $I_k^l$ ($0 \leq l \leq N-1$) may be separated from the previous image $I_{k-1}$ and current image $I_k$.

Preferably, the pairs obtaining module may determine pairs of rows (i, i') and pairs of columns (j, j') satisfying the conditions below as effective pairs of rows (i, i') and the effective pairs of columns (j, j').

$$\left| \frac{h_j^V(I_{k-1}^l) - h_{j'}^V(I_k^l)}{h_j^V(I_{k-1}^l)} \right| < T$$

$$\left| \frac{h_i^H(I_{k-1}^l) - h_{i'}^H(I_k^l)}{h_i^H(I_{k-1}^l)} \right| < T,$$

Where $h_j^V(I_{k-1}^l)$, $h_{j'}^V(I_k^l)$, $h_i^H(I_{k-1}^l)$ and $h_{i'}^H(I_k^l)$ respectively denote the number of pixels having pixel values within the certain range in column j, column j', row i and row i'; $I_{k-1}^l$ and $I_k^l$ respectively denote binary images of the previous image $I_{k-1}$ and current image $I_k$ ($0 \leq l \leq N-1$); and T is a constant.

Preferably, $a_{min}$, a minimum value of $a_{11}$ and $a_{22}$, and $a_{max}$, a maximum value of $a_{11}$ and $a_{22}$ can be set up by user and the Hough transformation module may perform Hough transformation in a range of $\theta$ as follows.

$$a\tan\left(-\frac{1}{a_{min}}\right) \leq \theta \leq a\tan\left(-\frac{1}{a_{max}}\right)$$

In accordance with another aspect of the present invention, there is provided an interface system using detection of changes in background of successive images, background changes detecting device for detecting changes in background of gray scale images using binary images of the gray scale images, said gray scale images being inputted successively in time; and display device, in communication with the background changes detecting device, for displaying images for implementing interface mechanism, wherein the display device comprises: display window for displaying images comprising images of menu buttons for implementing the interface mechanism; pointing means, displayed by the display window, for indicating certain menu button in the displayed images; and controlling module for receiving the detected changes in background from the background changes detecting device, controlling the pointing means to move in real time in proportion to the detected changes in background, and controlling functions assigned to a certain menu to be performed if, with the pointing means indicating the certain menu, the current image is enlarged or abridged from the previous image beyond predetermined proportion.

Preferably, the display device may further comprise: image input module for receiving successive inputs of gray scale images. Further, the background changes detecting device, in communication with the display device, may comprise: accumulated values obtaining module for separating both previous image $I_{k-1}$ and current image $I_k$ inputted through the image input module into same number of binary images, counting the number of pixels having pixel values within certain range of pixel values, said range of pixel values being respectively assigned to each binary image, and obtaining vertically accumulated values $h_j^V(I_{k-1})$, $h_{j'}^V(I_k)$ and horizontally accumulated values $h_i^H(I_{k-1})$, $h_i^H(I_k)$, said vertically accumulated values $h_j^V(I_{k-1})$, $h_{j'}^V(I_k)$ representing the total number of the counted pixels in each column of the previous image $I_{k-1}$ and current image $I_k$, said horizontally accumulated values $h_i^H(I_{k-1})$, $h_i^H(I_k)$ representing the total number of the counted pixels in each row of the previous image $I_{k-1}$ and current image $I_k$; pairs obtaining module for determining effective pairs of rows (i, i') of the previous image $I_{k-1}$ and current image $I_k$ and effective pairs of columns (j, j') of the previous image $I_{k-1}$ and current image $I_k$ on the basis of the accumulated values obtained by the accumulated values obtaining module; and Hough transformation module for transforming the effective pairs using Hough transformation and determining peak values $\rho^V$, $\theta^V$, $\rho^H$, $\theta^H$, wherein changes in background of images are detected from the peak values $\rho^V$, $\theta^V$, $\rho^H$, $\theta^H$.

Preferably, the background changes detecting device and the display device may be incorporated into one mobile device.

Preferably, the display device may be a mobile device and the display device may be in communication with the background changes detecting device wiredly or wirelessly.

Preferably, the display window may display the inputted images of gray scale.

Preferably, the detected changes in background of images may be determined by $a_{11}$, $a_{22}$, $b_1$, $b_2$ of the following equation.

$$A\begin{pmatrix} x \\ y \end{pmatrix} + B = \begin{pmatrix} x' \\ y' \end{pmatrix},$$

$$A = \begin{pmatrix} a_{11} & 0 \\ 0 & a_{22} \end{pmatrix}$$

$$B = \begin{pmatrix} b_1 \\ b_2 \end{pmatrix}$$

$$a_{11} > 0, a_{22} > 0$$

Where (x, y) denotes a point in the previous image $I_{k-1}$ and (x', y') denotes a corresponding point in the current image $I_k$.

Preferably, the accumulated values obtaining module may obtain vertically accumulated values $h_j^V(I_{k-1})$, $h_{j'}^V(I_k)$ and horizontally accumulated values $h_i^H(I_{k-1})$, $h_i^H(I_k)$ by counting the total number of pixels having pixel values within a range between $$\frac{255l}{N} \text{ and } \frac{255(l+1)}{N},$$

and N binary images $I_{k-1}^l$, $I_k^l$ ($0 \leq l \leq N-1$) may be separated from the previous image $I_{k-1}$ and current image $I_k$.

Preferably, the pairs obtaining module may determine pairs of rows (i, i') and pairs of columns (j, j') satisfying the conditions below as effective pairs of rows (i, i') and the effective pairs of columns (j, j').

$$\left| \frac{h_j^V(I_{k-1}^l) - h_{j'}^V(I_k^l)}{h_j^V(I_{k-1}^l)} \right| < T$$

$$\left| \frac{h_i^H(I_{k-1}^l) - h_{i'}^H(I_k^l)}{h_i^H(I_{k-1}^l)} \right| < T,$$

Where $h_j^V(I_{k-1}^l)$, $h_{j'}^V(I_k^l)$, $h_i^H(I_{k-1}^l)$ and $h_{i'}^H(I_k^l)$ respectively denote the number of pixels having pixel values within the certain range in column j, column j', row i and row i'; $I^l_{k-1}$ and $I^l_k$ respectively denote binary images of the previous image $I_{k-1}$ and current image $I_k$ ($0 \leq l \leq N-1$); and T is a constant.

Preferably, $a_{min}$, a minimum value of $a_{11}$ and $a_{22}$, and $a_{max}$, a maximum value of $a_{11}$ and $a_{22}$ can be set up by user and the Hough transformation module may perform Hough transformation in a range of θ as follows.

$$a\tan\left(-\frac{1}{a_{min}}\right) \leq \theta \leq a\tan\left(-\frac{1}{a_{max}}\right)$$

In accordance with another aspect of the present invention, there is provided an interface system using detection of changes in background of successive images, background changes detecting device for detecting changes in background of gray scale images using binary images of the gray scale images, said gray scale images being inputted successively in time; and display device, in communication with the background changes detecting device, for displaying images for implementing interface mechanism, wherein the display device comprises: display window for displaying images comprising images of menu buttons for implementing the interface mechanism; pointing means displayed by the display window and fixed to indicate a certain point of the display window; and controlling module for receiving the detected changes in background from the background changes detecting device, controlling the images displayed by the display window to move in real time in proportion to the detected changes in background, and controlling functions assigned to a certain menu to be performed if, with the pointing means indicating the certain menu, the current image is enlarged or abridged from the previous image beyond predetermined proportion.

Preferably, the display device may further comprise: image input module for receiving successive inputs of gray scale images. Further, the background changes detecting device, in communication with the display device, may comprise: accumulated values obtaining module for separating both previous image $I_{k-1}$ and current image $I_k$ inputted through the image input module into same number of binary images, counting the number of pixels having pixel values within certain range of pixel values, said range of pixel values being respectively assigned to each binary image, and obtaining vertically accumulated values $h_j^V(I_{k-1})$, $h_{j'}^V(I_k)$ and horizontally accumulated values $h_i^H(I_{k-1})$, $h_{i'}^H(I_k)$, said vertically accumulated values $h_j^V(I_{k-1})$, $h_{j'}^V(I_k)$ representing the total number of the counted pixels in each column of the previous image $I_{k-1}$ and current image $I_k$, said horizontally accumulated values $h_i^H(I_{k-1})$, $h_{i'}^H(I_k)$ representing the total number of the counted pixels in each row of the previous image $I_{k-1}$ and current image $I_k$; pairs obtaining module for determining effective pairs of rows (i, i') of the previous image $I_{k-1}$ and current image $I_k$ and effective pairs of columns (j, j') of the previous image $I_{k-1}$ and current image $I_k$ on the basis of the accumulated values obtained by the accumulated values obtaining module; and Hough transformation module for transforming the effective pairs using Hough transformation and determining peak values $\rho^V$, $\theta^V$, $\rho^H$, $\theta^H$, wherein changes in background of images are detected from the peak values $\rho^V$, $\theta^V$, $\rho^H$, $\theta^H$.

Preferably, the detected changes in background of images may be determined by $a_{11}$, $a_{22}$, $b_1$, $b_2$ of the following equation.

$$A\begin{pmatrix}x\\y\end{pmatrix} + B = \begin{pmatrix}x'\\y'\end{pmatrix},$$

-continued $$A = \begin{pmatrix} a_{11} & 0 \\ 0 & a_{22} \end{pmatrix}$$

$$B = \begin{pmatrix} b_1 \\ b_2 \end{pmatrix}$$

$$a_{11} > 0, a_{22} > 0$$

Where (x, y) denotes a point in the previous image $I_{k-1}$ and (x', y') denotes a corresponding point in the current image $I_k$.

Preferably, the accumulated values obtaining module may obtain vertically accumulated values $h_j^V(I_{k-1})$, $h_{j'}^V(I_k)$ and horizontally accumulated values $h_i^H(I_{k-1})$, $h_{i'}^H(I_k)$ by counting the total number of pixels having pixel values within a range between $$\frac{255l}{N} \text{ and } \frac{255(l+1)}{N},$$

and N binary images $I^l_{k-1}$, $I^l_k$ ($0 \leq l \leq N-1$) may be separated from the previous image $I_{k-1}$ and current image $I_k$.

Preferably, the pairs obtaining module may determine pairs of rows (i, i') and pairs of columns (j, j') satisfying the conditions below as effective pairs of rows (i, i') and the effective pairs of columns (j, j').

$$\left|\frac{h_j^V(I^l_{k-1}) - h_{j'}^V(I^l_k)}{h_j^V(I^l_{k-1})}\right| < T$$

$$\left|\frac{h_i^H(I^l_{k-1}) - h_{i'}^H(I^l_k)}{h_i^H(I^l_{k-1})}\right| < T,$$

Where $h_j^V(I^l_{k-1})$, $h_{j'}^V(I^l_k)$, $h_i^H(I^l_{k-1})$ and $h_{i'}^H(I^l_k)$ respectively denote the number of pixels having pixel values within the certain range in column j, column j', row i and row i'; $I^l_{k-1}$ and $I^l_k$ respectively denote binary images of the previous image $I_{k-1}$ and current image $I_k$ ($0 \leq l \leq N-1$); and T is a constant.

Preferably, $a_{min}$, a minimum value of $a_{11}$ and $a_{22}$, and $a_{max}$, a maximum value of $a_{11}$ and $a_{22}$ can be set up by user and the Hough transformation module may perform Hough transformation in a range of θ as follows.

$$a\tan\left(-\frac{1}{a_{min}}\right) \leq \theta \leq a\tan\left(-\frac{1}{a_{max}}\right)$$

Preferably, the background changes detecting device and the display device may be incorporated into one mobile device.

Preferably, the display device may be a mobile device and the display device may be in communication with the background changes detecting device wiredly or wirelessly.

Preferably, the display window may display the inputted images of gray scale.

BRIEF DESCRIPTION OF THE DRAWINGS

The above and other objects, features and advantages of the invention will be more apparent from the following detailed description taken in conjunction with the accompanying drawings, in which.

DETAILED DESCRIPTION OF THE PREFERRED EMBODIMENTS

Figure 1:
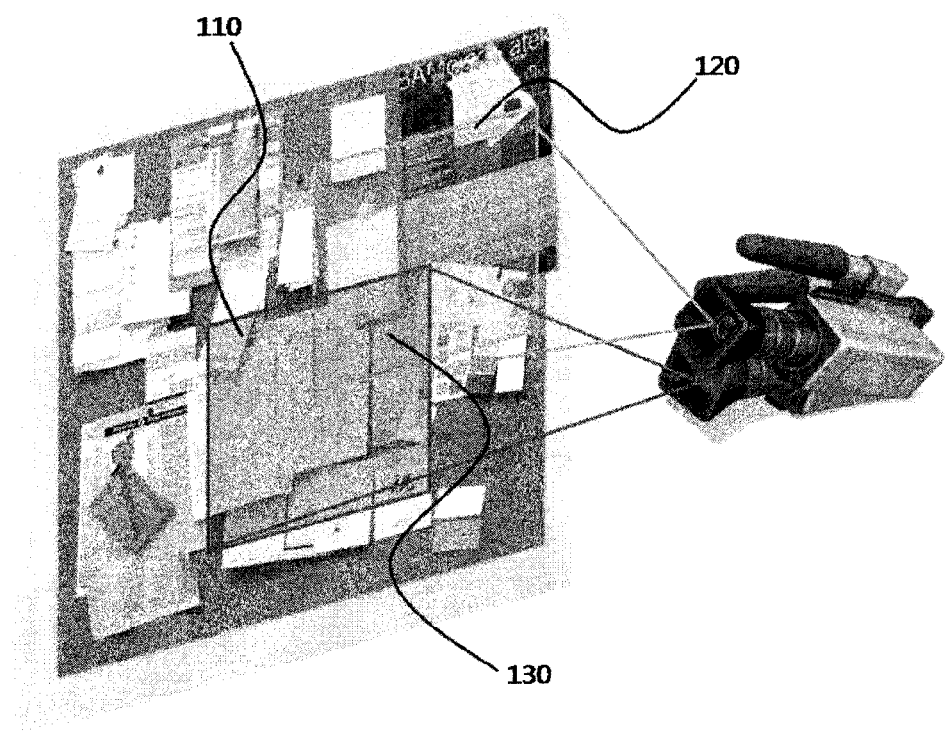
FIG. 1 illustrates that images obtained by the same camera become different when pose of the camera is changed while object to be photographed is fixed.

Since many alternatives, modifications and variations can be made from the invention, preferred embodiments of the invention will now be described in detail with reference to the accompanying drawings. However, one should understand that it is not intended to be limiting, but embrace all modification, equivalents or substitutions included in the scope and technical field of the invention. In the following description, well-known functions or constitutions will not be described in detail if they would obscure the invention in unnecessary detail.

Although terms like the first, the second, etc., may be used for explaining diverse elements, the elements are not to be limited by the terms. The terms are used only for distinguishing one element from another.

The terminology used in this specification is used simply for explaining particular embodiments, and is not intended to limit the scope of the invention in any way. As used throughout this disclosure, the singular forms include plural reference unless the context clearly indicates otherwise. Also, it should be understood that the expression of "comprise" or "include" in this disclosure is to designate the existence of features, numbers, steps, operations, elements, parts or combinations thereof that are described in the specification, and does not eliminate beforehand the existence of one or more of other features, numbers, steps, operations, elements, parts, or combinations thereof or the possibility of addition.

Hereinafter, preferred embodiments of the invention will now be described with reference to the accompanying drawings. For a more complete understanding of the invention and the advantages thereof, like reference numerals represent like parts even in different drawings.

Before getting into further details on the drawings, it is necessary to clarify that components described in this specification are divided by primary function each component is responsible for. That is, two or more components to be described below may be incorporated into one component, or one component may be differentiated into more than two by itemized function. In addition, any person skilled in the art may understand that each component may perform, besides its primary function, part or all of functions of another component additionally, and part of the primary function each component is responsible for may be carried out by another component. Therefore, it is important to note whether all components that are explained throughout this specification exist or not should be interpreted in terms of function, and for this reason the configuration of components of a device for detecting changes in background of images and an interface system in accordance with the invention may differ from that illustrated in Figures within the scope for achieving the foregoing objectives of the present invention.

FIG. 1 illustrates that images obtained by the same camera become different when pose of the camera is changed while object to be photographed is fixed. As illustrated in FIG. 1, if pose of the camera is changed, then photographed image or background of the photographed image (in a case where there are any moving objects among objects to be photographed) is changed despite no movement of the objects to be photographed. There may be common area 130 between two images 110, 120. On the other hand, there may not be any common area between previous image and current image depending on the amount of movements of camera.

Figure 2:
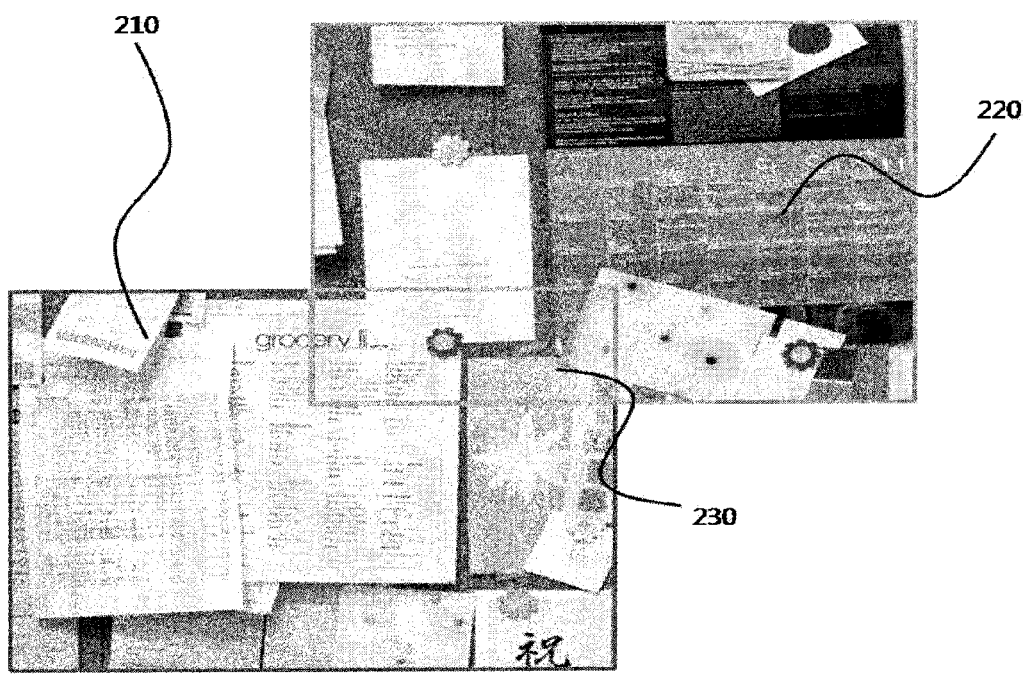
FIG. 2 illustrates images obtained before and after changing camera's pose in a case where pose of the camera has been changed as illustrated in FIG. 1.

FIG. 2 illustrates images obtained before and after changing camera's pose in a case where pose of the camera has been changed as illustrated in FIG. 1. FIG. 2 illustrates common area which may exist between the two images. There is a common area 230 between the two images so that it is possible to assume how much and in which direction camera's pose has been moved from the previous pose. That is, from how much background of the image has been changed, it can be known how much the camera has been moved. Accordingly, it is possible to do background compensation according to movements of the camera.

Figure 3:
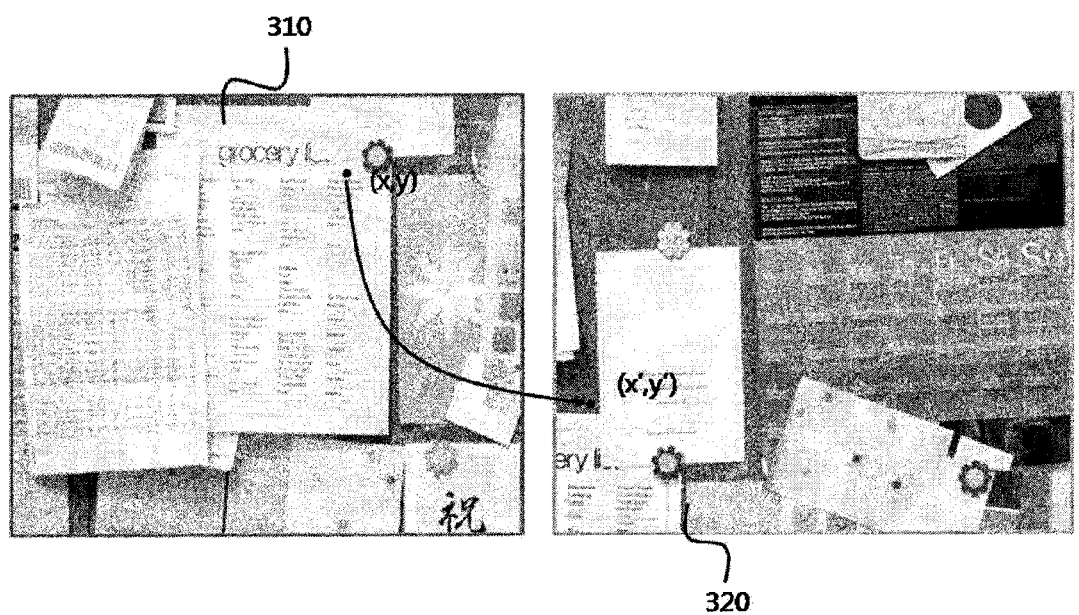
FIG. 3 illustrates previous image and current image having common feature point.

FIG. 3 illustrates previous image and current image having common feature point.

If a feature point (x', y') in current image 320 corresponding to a point (x, y) in previous image 310 is found, it is possible to find out how much camera's pose has been changed since the amount of the movements of the feature point depends on the camera's movement.

If the movements of the camera comprise only up and down/right and left/zoom in and zoom out, the movements of the feature point between two successive images can be expressed through geometric transform.

Let $I_k$ and $I_{k-1}$ be the image at time index k (current image) and k−1 (previous image), respectively. In FIG. 3, let (x, y) and (x', y') be feature point in $I_{k-1}$ and corresponding feature point in $I_k$ respectively. The relation between (x, y) in $I_{k-1}$ and (x', y') in $I_k$ can be expressed as:

$$A\begin{pmatrix}x\\y\end{pmatrix} + B = \begin{pmatrix}x'\\y'\end{pmatrix} \quad (1)$$

in which A is a 2×2 matrix and B is a 2×1 matrix:

$$A\begin{pmatrix}a_{11} & 0\\ 0 & a_{22}\end{pmatrix} B = \begin{pmatrix}b_1\\b_2\end{pmatrix} a_{11} > 0, a_{22} > 0 \quad (2)$$

and the gray level of (x, y) in $I_{k-1}$ is equal to that of (x', y') in $I_k$:

$$I_k(x',y') = I_{k-1}(x,y) \quad (3)$$

All points (x', y') corresponding to points (x, y) can be obtained by Equation 1. That is, the transformation maps all points that have the same coordinates x in $I_{k-1}$ to those having the same coordinates x'-$a_{11}$x+$b_1$ in $I_k$, i.e., it maps vertical lines to vertical lines. Similarly, the transformation maps all points having the same coordinates y in $I_{k-1}$ to those having the same coordinates y'=$a_{22}$y+$b_2$ in $I_k$, i.e., it maps horizontal lines to horizontal lines.

In this regard, Equation 1 is expressed as a linear equation of vertical line and horizontal line. By using Hough transformation in obtaining parameters from such linear equation, it is possible to perform detection which is robust to noise and changes in illumination.

While ordinary Hough transformation is for detecting certain type of components such as lines in images through parameter detection, the invention is to detect changes in successive images using Hough transformation.

Figure 4:
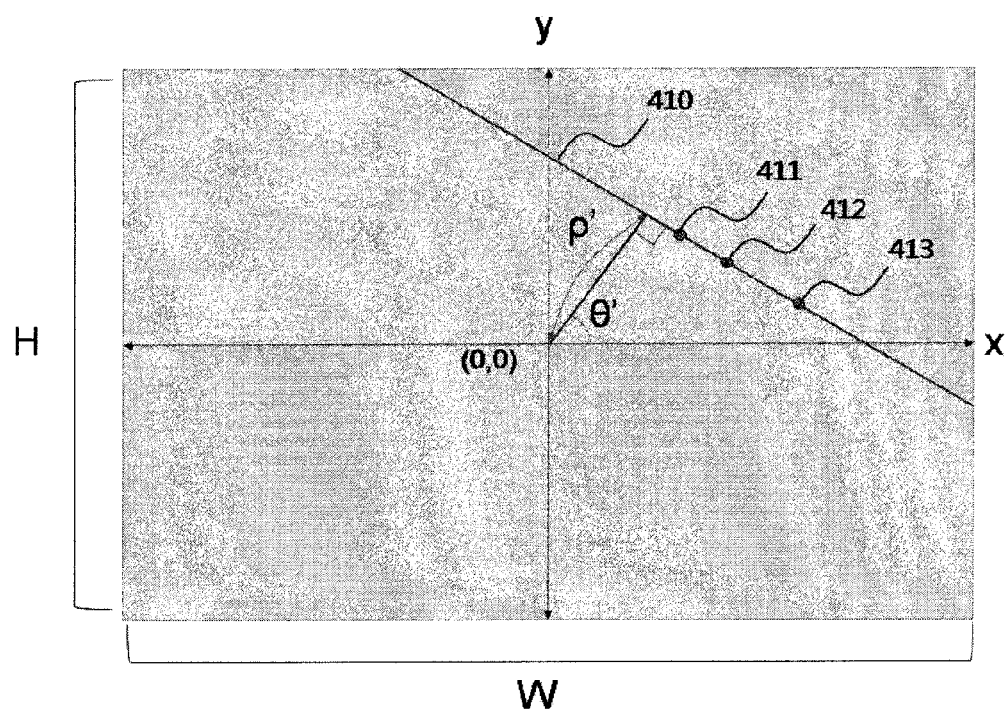
FIG. 4 illustrates a graph for illustrating Hough transformation used for methods and devices for detecting changes in background of images according to the invention.

FIG. 4 illustrates a graph for illustrating Hough transformation used for methods and devices for detecting changes in background of images according to the invention. In order to perform Hough transformation, center point to be used for Hough transformation is set up in the inputted image. For example, size of the image is 640×480, the center point may be set up at (320, 240). The distance from the center point to a pixel in the image is designated by p (If size of the image is 640×480 and the center point is set up at (320, 240), −400≦ρ≦400) and the angle that center line and a line connecting the center point and the pixel made is designed by θ.

All pixels in the inputted image are mapped to ρ, θ coordinate system through Hough transformation satisfying the equation below:

$$x\cos\theta + y\sin\theta = \rho \quad (4)$$

ρ, θ coordinate system is a coordinate system obtained by Hough transforming x, y coordinate system. Space of the ρ, θ coordinate system is called Hough space.

Figure 5:
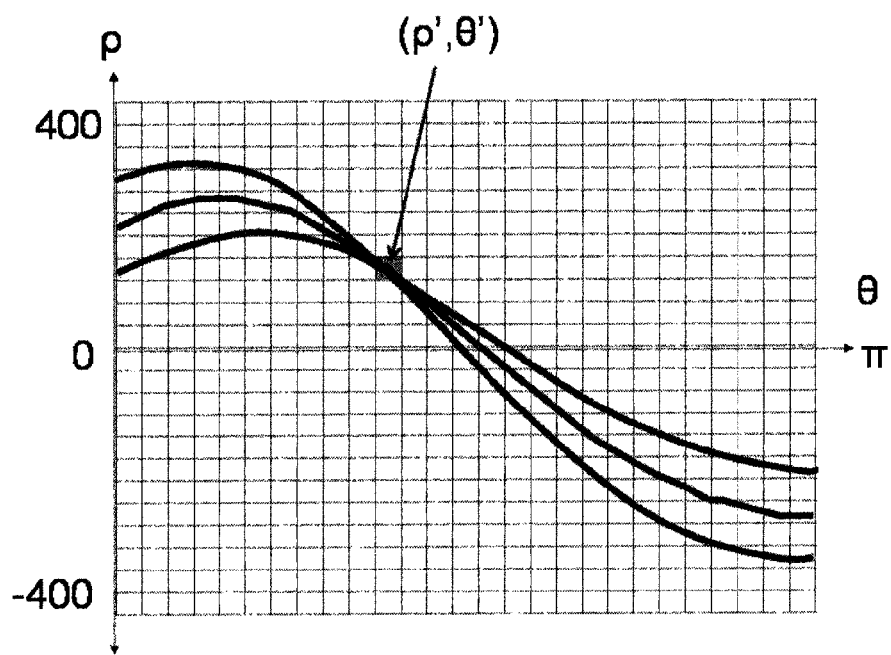
FIG. 5 illustrates a result of Hough transformation performed regarding three points on the line in FIG. 4.

FIG. 5 illustrates a result of Hough transformation performed regarding three points on the line in FIG. 4.

The three points 411, 412, 413 on the same line 410 illustrated in FIG. 4 were transformed to three sine curves in Hough space. The Hough space consists of vertical axis of varying ρ and horizontal axis of varying θ. The three sine curves cross at one point (ρ', θ') in the Hough space. The point where the three sine curves cross is peak point and it is possible to get linear equation of the line 410 passing by the three points 411, 412, 413 from the peak point (ρ', θ').

Figure 6:
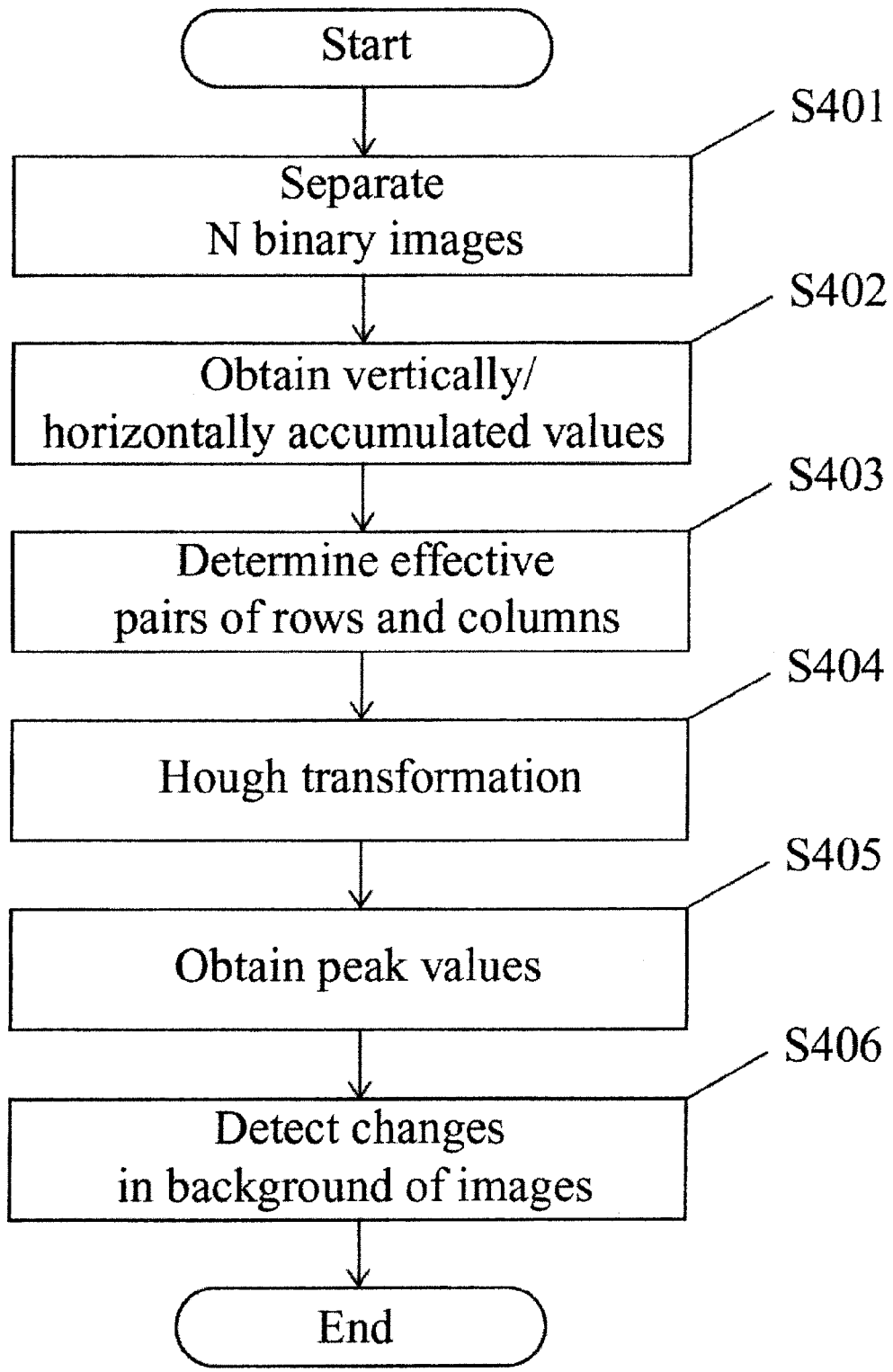
FIG. 6 illustrates flow charts of method for detecting changes in background of images using multiple binary images thereof and Hough transformation according to the invention.

FIG. 6 illustrates flow charts of method for detecting changes in background of images using multiple binary images thereof and Hough transformation according to the invention.

Among gray scale images successively inputted and stored in a frame buffer, let $I_k$ and $I_{k-1}$ be the image at time index k (current image) and k−1 (previous image), respectively. In this regard, except for the first moment of receiving input of the gray scale image, there are previous image and current image all the time.

According to the method for detecting changes in background of images using multiple binary images thereof and Hough transformation, gray scale previous image $I_{k-1}$ and current image $I_k$ are inputted and N binary images are respectively separated from both gray scale previous image $I_{k-1}$ and current image $I_k$. This is because separating gray scale image into multiple binary images guarantees robustness to changes in illumination, rather than extracting one binary image from gray scale image.

In connection with those separation of N binary images, N binary images $I^l_{k-1}$ (0≦l≦N−1) are separated from the gray scale previous image $I_{k-1}$. At the same time, N binary images $I^l_k$ (0≦l≦N−1) are separated from the gray scale current image $I_k$ (S401).

After N binary images are respectively separated from the gray scale previous image and gray scale current image, vertically accumulated values $h^V_j(I_{k-1})$, $h^V_{j'}(I_k)$ (j=0, 1, ..., W−1; j'=0, 1, ..., W−1) at column j, j' and horizontally accumulated values $h^H_i(I_{k-1})$, $h^H_{i'}(I_k)$ (i=0, 1, ..., H−1; i'=0, 1, ..., H−1) at row i, i' are obtained for both the previous image and the current image (S402). In this regard, for N binary images separated from the previous image, it is determined whether each pixel value (or intensity) of pixels in the binary image $I^l_{k-1}$ is within a range from $$\frac{255l}{N} \text{ to } \frac{255(l+1)}{N}$$

and all pixels whose intensity ranges from $$\frac{255l}{N} \text{ to } \frac{255(l+1)}{N}$$

are pixels 1 in the binary image $I^l_{k-1}$, otherwise they are pixels 0. Similarly, it is determined whether each pixel value (or intensity) of pixels in the binary image $I^l_k$ is within a range from $$\frac{255l}{N} \text{ to } \frac{255(l+1)}{N}$$

and all pixels whose intensity ranges from $$\frac{255l}{N} \text{ to } \frac{255(l+1)}{N}$$

are pixels 1 in the binary image $I^l_k$, otherwise they are pixels 0.

Herein, the horizontally accumulated value means the total number of pixels 1 per each row throughout N binary images and it can be expressed as horizontal histogram. Similarly, the vertically accumulated value means the total number of pixels 1 per each column throughout N binary images and it can be expressed as vertical histogram.

For example, if N is 8, the number of binary images separated from the previous image is 8 and the number of binary images separated from the current image is 8. Further, the range of pixel values (or intensity) is obtained by dividing total pixel value range (e.g., 256) by 8. Further, a vertically accumulated value $h_0^V(I_{k-1})$ at first column (j=0) of the previous image means a total sum of the number of pixels 1 at first column in all 8 binary images (i.e., a total sum of the number of pixels at first column in each binary image whose pixel values are within the allotted ranges of pixel value) of the previous image. Similarly, a horizontally accumulated value $h_0^H(I_k)$ at first row (i'=0) of the current image means a total sum of the number of pixels 1 at first row in all 8 binary images (i.e., a total sum of the number of pixels at first row in each binary image whose pixel values are within the allotted ranges of pixel value) of the current image.

After all vertically accumulated values and horizontally accumulated values for columns and rows of the previous image and the current image are obtained, effective pairs of rows (i, i') of the previous image $I_{k-1}$ and current image $I_k$ and effective pairs of columns (j, j') of the previous image $I_{k-1}$ and current image $I_k$ are determined based on the condition below (S403). More particularly, the effective pairs of rows (i, i') and the effective pairs of columns (j, j') are determined depending on whether they satisfy the condition below.

$$\left| \frac{h_j^V(I_{k-1}^l) - h_{j'}^V(I_k^l)}{h_j^V(I_{k-1}^l)} \right| < T \tag{7}$$

$$\left| \frac{h_i^H(I_{k-1}^l) - h_{i'}^H(I_k^l)}{h_i^H(I_{k-1}^l)} \right| < T \tag{8}$$

where T denotes the tolerance, a parameter of the method. The value of T can be set as small value if it is necessary to find pairs whose accumulated values are similar and the value of T can be set as large value if it is necessary to find pairs whose accumulated values are quite different.

Pairs of columns (j, j') and pairs of rows (i, i') respectively satisfying the Equations (7) and (8) satisfies the Equations below.

$$j' = a_{11} j + b_1 \tag{9}$$

$$i' = a_{22} i + b_2 \tag{10}$$

Equation 9 demonstrates that the relationship between j and j' in the pairs is linear and $a_{11}$ and $b_1$ respectively correspond to slope and intercept. Similarly, Equation 10 demonstrates that the relationship between i and i' in the pairs is linear and $a_{22}$ and $b_2$ respectively correspond to slope and intercept. Thus, the parameters $a_{11}$ and $b_1$, $a_{22}$ and $b_2$ can be determined via Hough transformation.

In order to determine the parameters $a_{11}$, $b_1$, $a_{22}$, $b_2$ using Hough transformation, all points (j, j') and (i, i') are respectively transformed into Hough space as sinusoidal curves using Equations below (S404).

$$\rho = j \cos \theta + j' \sin \theta \tag{11}$$

$$\rho = i \cos \theta + i' \sin \theta \tag{12}$$

After the Hough transformation, peak values $\rho^V$, $\theta^V$, $\rho^H$, $\theta^H$, are obtained from Hough space (S405). Herein, peak values $\rho^V$, $\theta^V$, $\rho^H$, $\theta^H$ mean the values of $\rho$ and $\theta$ at the peak point. From the relationship between the peak values, the parameters $a_{11}$, $b_1$, $a_{22}$, $b_2$ are determined as below and thus changes in background of images can be detected (S406).

$$a_{11} = -\frac{\cos\theta^V}{\sin\theta^V}, \quad b_1 = \frac{\rho^V}{\sin\theta^V} \tag{13}$$

$$a_{22} = -\frac{\cos\theta^H}{\sin\theta^H}, \quad b_2 = \frac{\rho^H}{\sin\theta^H} \tag{14}$$

In order to reduce the Hough transformation process time, it is desirable to reduce the range of $\theta$. The parameters $a_{11}$ and $a_{22}$ are scaling factors of the transformation. They have a value larger than 1 if the image is enlarged while they have a value smaller than 1 if the size of image is reduced. Considering this, the effective range $[a_{min}, a_{max}]$ including the value of 1 is set up and Hough transformation may be performed to satisfy the below condition.

$$a\tan\left(-\frac{1}{a_{min}}\right) \leq \theta \leq a\tan\left(-\frac{1}{a_{max}}\right) \tag{15}$$

Figure 7:
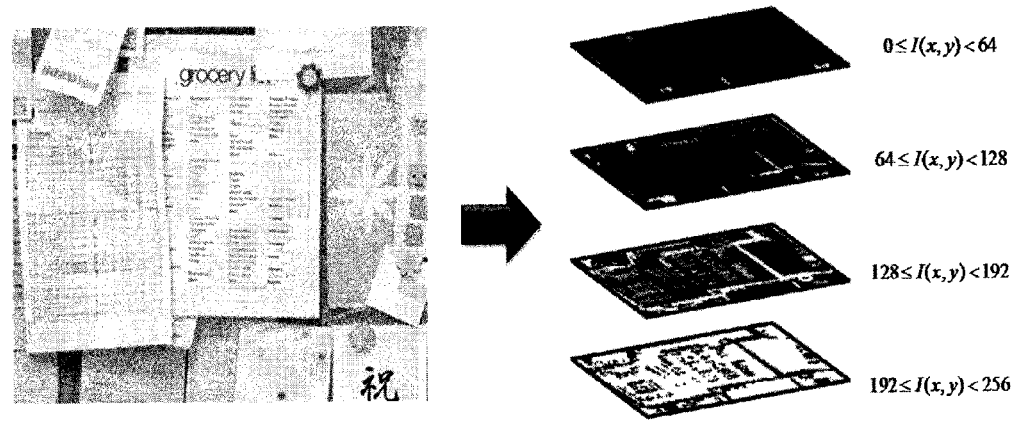
FIG. 7 illustrates an exemplary configuration of binary images extracted from one gray scale image.

FIG. 7 illustrates an exemplary configuration of binary images extracted from one gray scale image.

As illustrated in FIG. 7, four (In FIG. 7, N=4) binary images 720, 730, 740, 750 are generated from gray scale image 710 (e.g., it can be previous image or current image).

For example, the value of 1 is assigned to all pixels whose pixel values are within $0 \leq I(x, y) \leq 64$ in the binary image 720, within $64 \leq I(x, y) \leq 128$ in the binary image 730, within $128 \leq I(x, y) \leq 192$ in the binary image 740, and within $192 \leq I(x, y) \leq 256$ in the binary image 750. The value of 0 is assigned to all the other pixels. Then, the total sum of the number of pixels having the value of 1 in four binary images 720, 730, 740, 750 is obtained per each column and each row.

Figure 8:
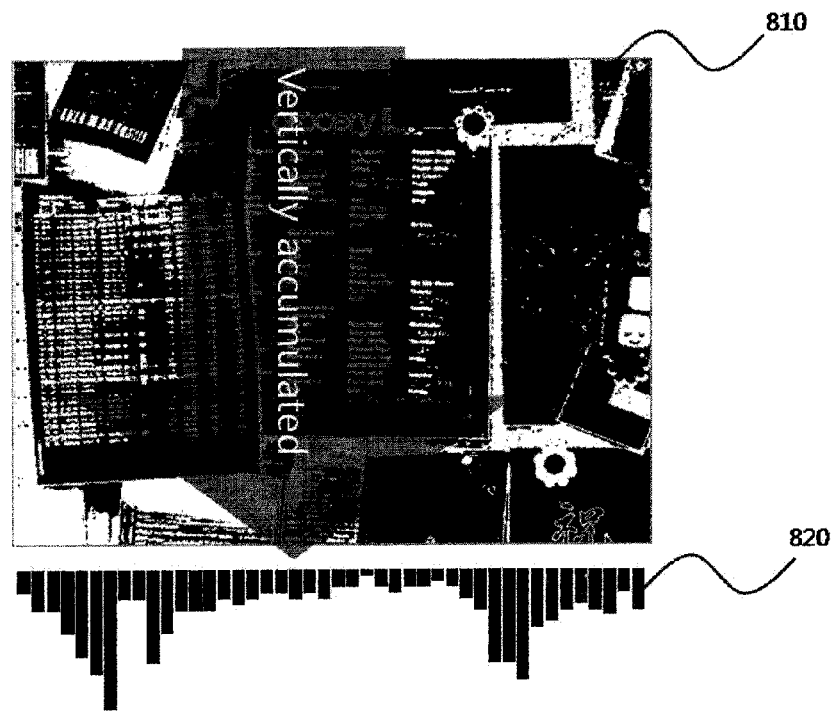
FIG. 8 illustrates histograms corresponding to distribution of vertically accumulated values obtained by the method for detecting changes in background of images according to the invention.

FIG. 8 illustrates histograms corresponding to distribution of vertically accumulated values obtained by the method for detecting changes in background of images according to the invention.

Histograms 820 illustrated below the image 810 represents vertically accumulated values in each column throughout the binary images and size of the histograms 820 is proportional to the vertically accumulated values in the image 810. The practical number of the histograms is not limited by the number of histograms illustrated in FIG. 8 and the practical number of histograms is equal to the number of columns in the image. Further, as mentioned above, the vertically accumulated values are obtained respectively from both the previous image and the current image.

Figure 9:
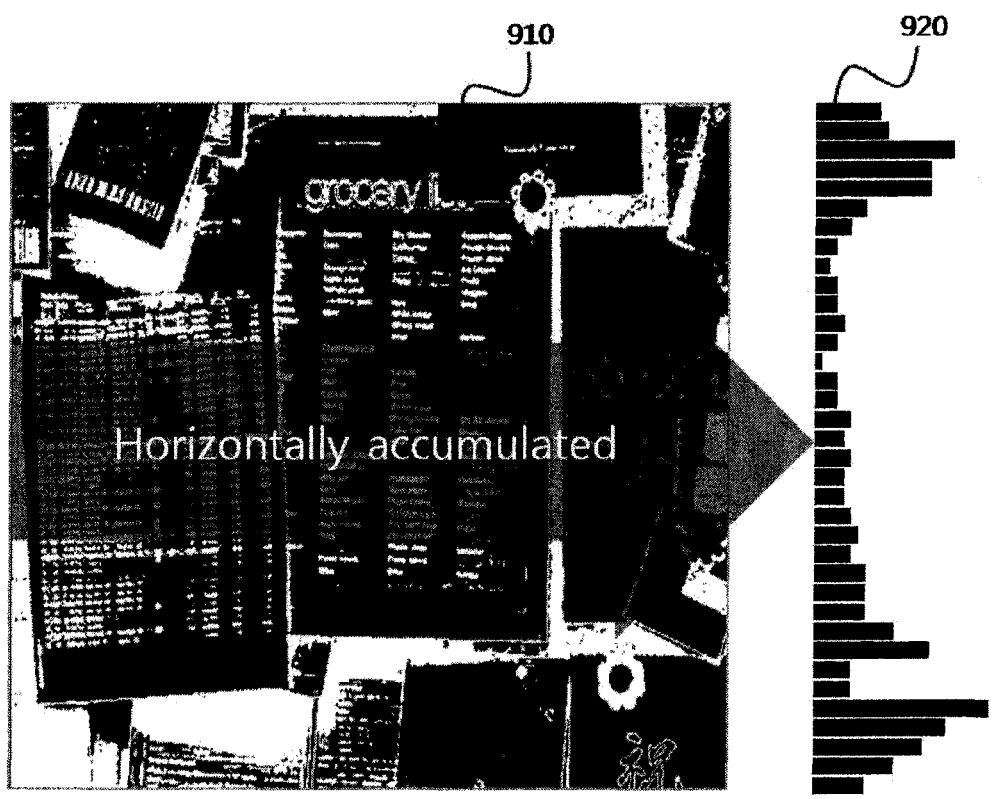
FIG. 9 illustrates histograms corresponding to distribution of horizontally accumulated values obtained by the method for detecting changes in background of images according to the invention.

FIG. 9 illustrates histograms corresponding to distribution of horizontally accumulated values obtained by the method for detecting changes in background of images according to the invention.

Histograms 920 illustrated in the right side of the image 910 represents horizontally accumulated values in each row throughout the binary images and size of the histograms 920 is proportional to the horizontally accumulated values in the image 910. The practical number of the histograms is not limited by the number of histograms illustrated in FIG. 9 and the practical number of histograms is equal to the number of rows in the image. Further, as mentioned above, the horizontally accumulated values are obtained respectively from both the previous image and the current image.

Figure 10:
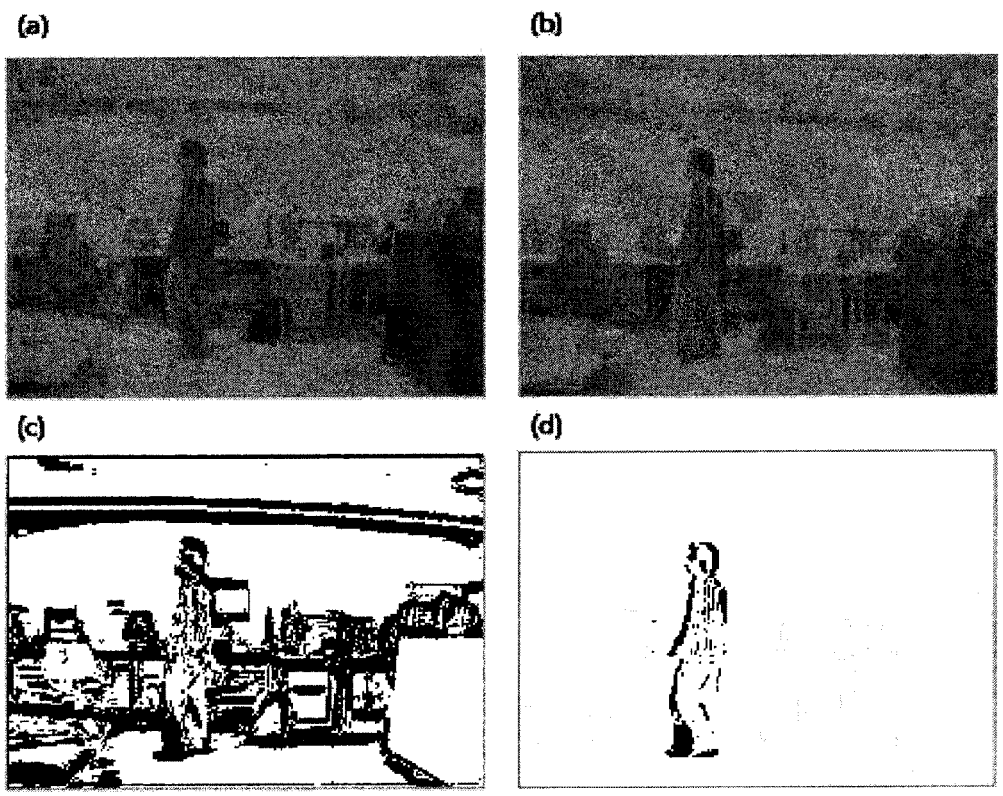
FIG. 10 illustrates effects of background compensation by the method for detecting changes in background of images according to the invention

FIG. 10 illustrates effects of background compensation by the method for detecting changes in background of images according to the invention FIG. 10 (*a*) and FIG. 10 (*b*) illustrate two successively inputted images where there are movements of image input means such as camera. Typically, in order to detect movements of moving objects in images, difference image is calculated. In this case as illustrated in FIG. 10 (*a*) and FIG. 10 (*b*), typical method for detecting movements of moving objects is sensitive to movements of the image input means such as camera and thus background of the image as well as the practical moving object (In this case, walking man) are shaken as illustrated in FIG. 10 (*c*). Thus, it becomes impossible to track movements of the moving object by the conventional method.

FIG. 10 (*d*) illustrates movements of the moving objects only without background of the images that are not practically moving. FIG. 10 (*d*) is a result of detecting changes in background of the images by the method for detecting changes in background of images according to the invention, moving the previous image as much as the movements of the camera considering the detected changes, and subtracting the previous image from the current image.

As illustrated in FIG. 10, the method for detecting changes in background of images according to the invention has an advantage in that it is possible to precisely track movements of the moving objects in images despite movements of the image input means such as camera.

Figure 11:
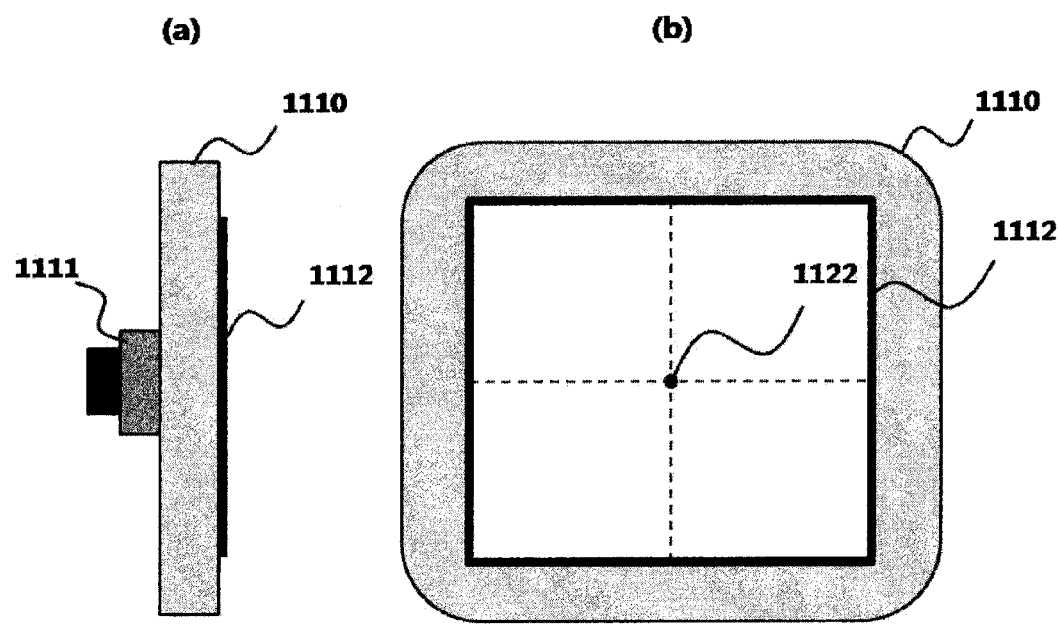
FIG. 11 illustrates partial configuration of an interface system using detection of changes in background of images according to one embodiment of the invention.

FIG. 11 illustrates partial configuration of an interface system using detection of changes in background of images according to one embodiment of the invention. FIG. 11 illustrates side view of display device 1110 of the interface system and front view of the display device 1110 of the interface system.

The interface system comprises the display device 1110 and image input module 1111 such as camera connected to the display device 1110. Camera, image input module 1111, is mounted onto the rear surface of the display device 1110 in order for the camera to receive inputs of images in the same direction as viewer looks at the display device 1110. There is a center point 1122 at the center of display screen 1112 of the display device 1110.

Herein, it is explained that the image input module is mounted to the display device. However, one should understand that according to the invention, the image input module can be variously implemented as separate module connected to another device of the interface system.

Figure 12:
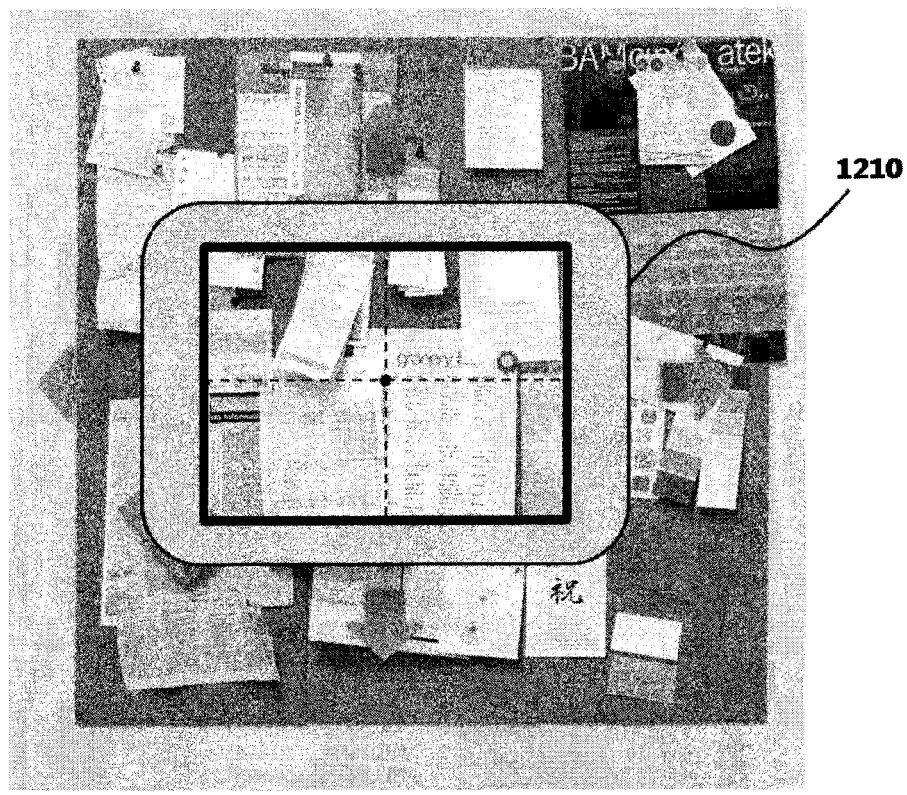
FIG. 12 illustrates display device of the interface system according to one embodiment of the invention displaying images obtained by image input module.

FIG. 12 illustrates display device of the interface system according to one embodiment of the invention displaying images obtained by image input module.

It is shown that the display device 1210 is located above the planar object which is bigger than the display device 1210 and the display device 1210 displays partial image of the planar object obtained by the image input module connected to the display device 1210.

Herein, the display device equipped with the image input module (In FIG. 12, it is mounted onto the rear surface of the display device) can move upward/downward/rightward/leftward as the arrows indicate in parallel with the planar object.

Figure 13:
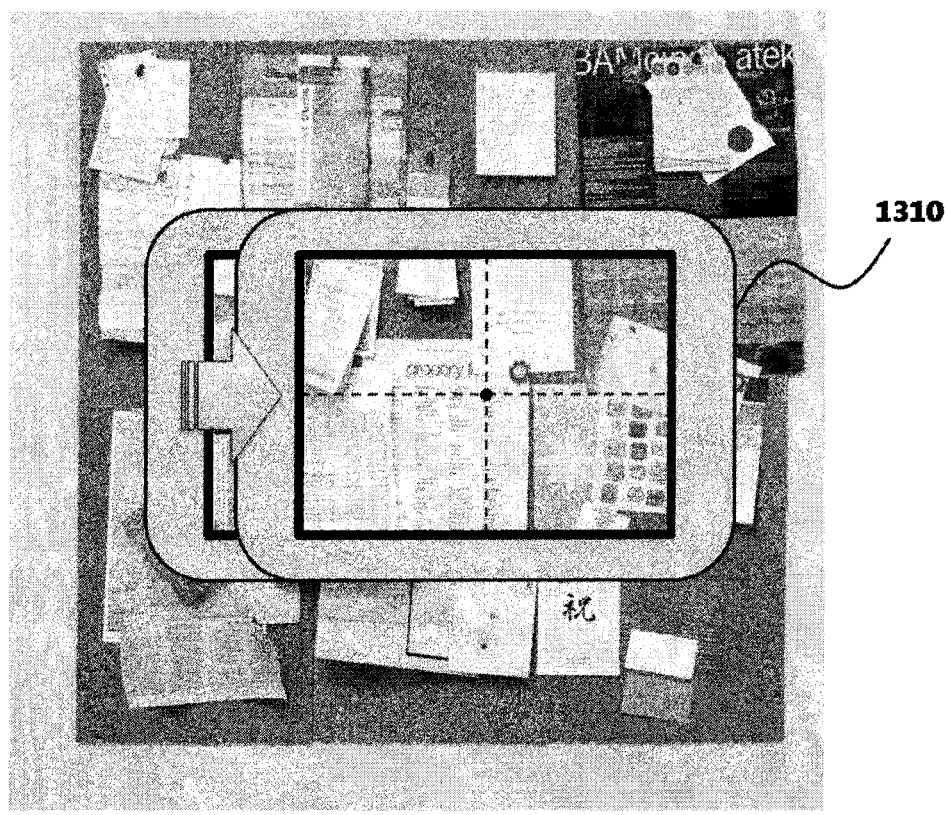
FIG. 13 illustrates that display device of the interface system according to one embodiment of the invention displaying images obtained by image input module has been moved.

FIG. 13 illustrates that display device of the interface system according to one embodiment of the invention displaying images obtained by image input module has been moved. From FIG. 13, it can be known that the display device 1310 equipped with the image input module has been moved from left side to right side.

Figure 14:
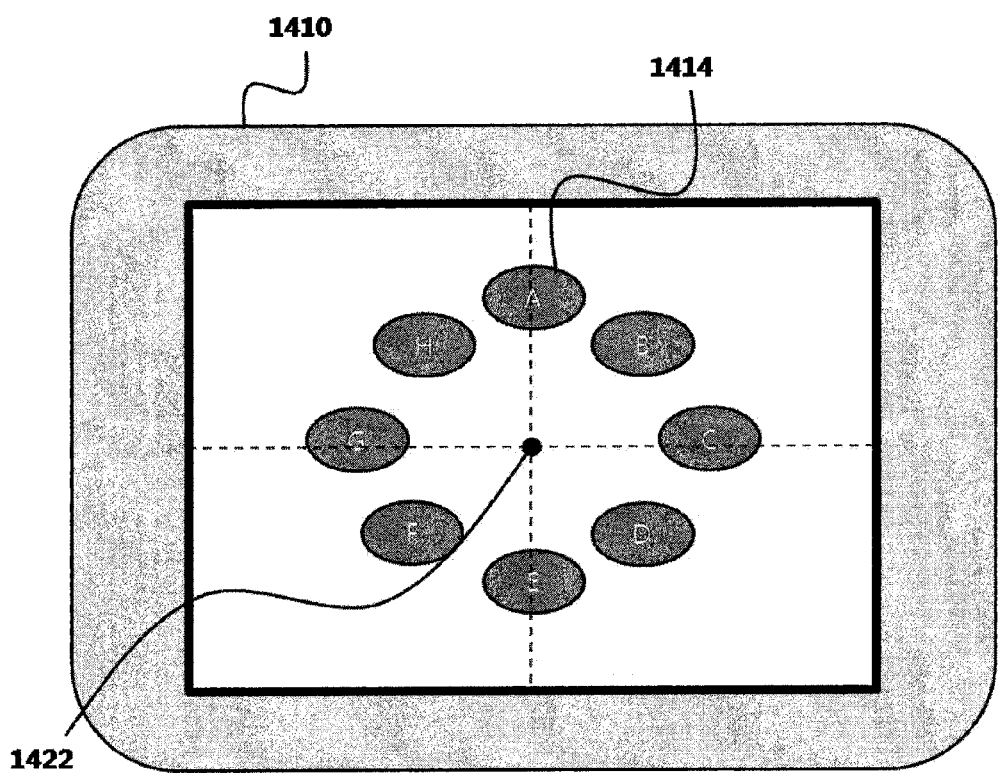
FIG. 14 illustrates display device of the interface system according to one embodiment of the invention displaying images for implementing interface mechanism.

FIG. 14 illustrates display device of the interface system according to one embodiment of the invention displaying images for implementing interface mechanism.

FIG. 14 illustrates display device 1410 of the interface system and display screen of the display device 1410 displays menu buttons 1414 rather than images obtained by the image input module. In other words, one should understand that the display device does not necessarily display images obtained by the image input module in order to detect changes in background of images in accordance with the invention. In this regard, it is possible to implement the interface system according to the invention by displaying menu buttons without regard to the detection of changes in background of images.

In a case where the display device equipped with the image input module has been moved, the amount of the movements of the image input module detected by the method according to the invention is reflected to the amount of the movements of pointing means in the display screen such as mouse pointer, cursor, center point 1422 with a predetermined direction and proportion so that it is possible to control movements of the pointing means in the display screen based on the movements of the display device equipped with the image input module. On the other hand, the interface system in accordance with the invention can be designed such that the amount of the detected movements of the image input module is reflected to the amount of the movements of currently displayed image with a predetermined direction and proportion. In this case, it is possible to design the pointing means as a center point which is located at the center of the display screen.

The proportion of the movements of the pointing means in the display screen to the movements of the image input module and the moving direction of the pointing means in the display screen can be freely set up depending on user's design. For example, assuming that images obtained by the image input module are displayed in a display screen having the same size as size of the practical display screen, it is possible to convert detected changes in background of images into the distance between two pixels in the display screen and to make the pointing means (or displayed image, instead) move in the display screen as much as the distance between the two pixels. On the other hand, it is possible to set proportion of the detected changes and the amount of movements of the pointing means as K:1 (e.g., K is positive real number). Further, moving direction of the pointing means in the display screen can be freely determined (e.g., in the same direction as moving direction of the image input module or in the opposite direction of moving direction of the image input module).

Figure 15:
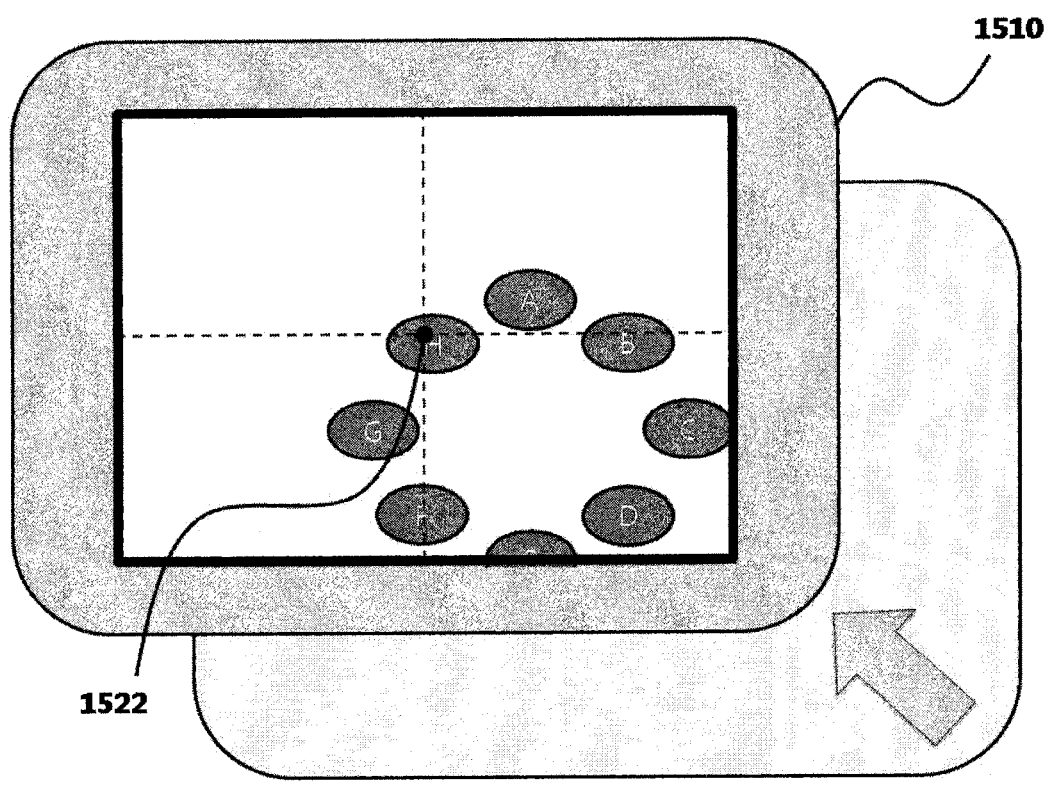
FIG. 15 illustrates that display device of the interface system according to one embodiment of the invention displaying images for implementing interface mechanism has been moved.

FIG. 15 illustrates that display device of the interface system according to one embodiment of the invention displaying images for implementing interface mechanism has been moved.

As illustrated in FIG. 15, display device 1510 of the interface system according to the invention has been moved as indicated by the arrow. Accordingly, the center point 1422, 1522 indicating somewhere around the menu buttons in FIG. 14 changed its position to indicate "H" menu button which is located in the upper left side of the group of the menu buttons.

This means that moving direction of the center point in the display screen is designed as same as moving direction of the image input module (or the display device equipped with the image input module) detected by the method according to the invention. As mentioned in connection with FIG. 14, one should understand that the invention is not limited as having the same moving direction of the center point in the display screen as moving direction of the image input module (or the display device equipped with the image input module).

Figure 16:
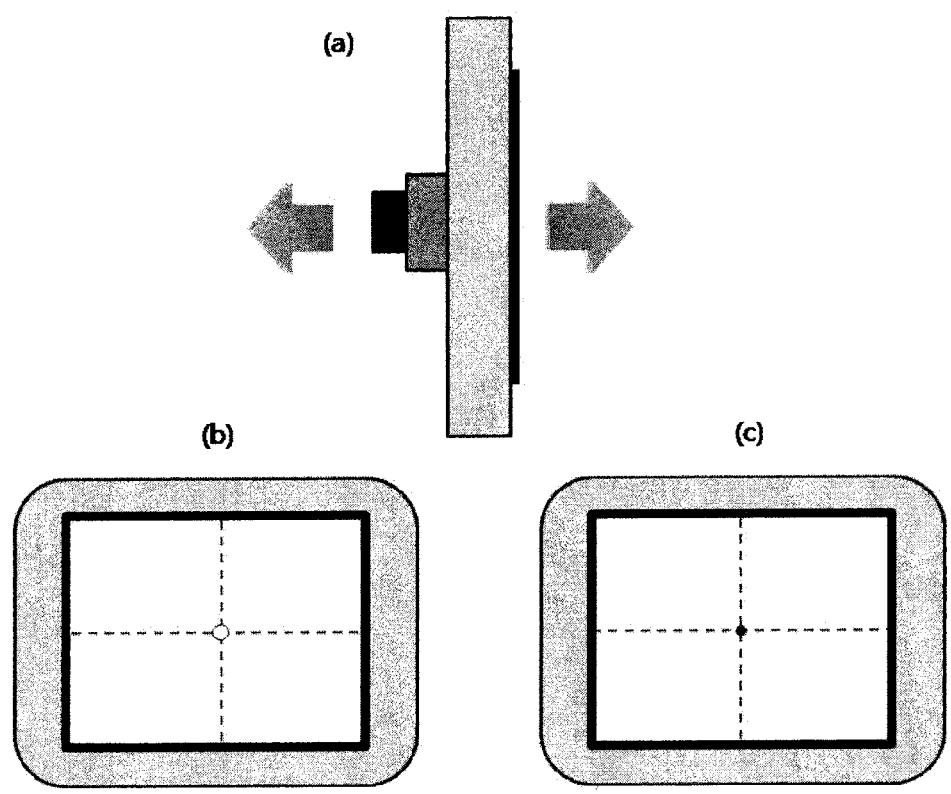
FIG. 16 illustrates side view of the display device equipped with image input module and front views of display devices displaying images when the display device moves forward and backward.

FIG. 16 illustrates side view of the display device equipped with image input module and front views of display devices displaying images when the display device moves forward and backward.

The display device of the interface system according to the invention moves (FIG. 16 (a)) closer to (FIG. 16 (b)) or away from (FIG. 16 (c)) objects in directions of arrows. Using this, the interface system according to one embodiment of the invention can be freely implemented in order to be able to control whether functions assigned to menu buttons displayed in the display screen are performed or not.

For example, current image gets enlarged comparing with the previous image as the image input module moves closer to the object. In connection with this, ordinary skilled in the art can understand that it is possible to design the interface system in accordance with the invention such that enlargement of the image beyond the predetermined proportion is recognized as instructions like mouse click. That is, the interface system according to the invention can be designed such that, if it is determined that the current image is enlarged beyond predetermined proportion while any pointing means indicates a menu button in the previous image, functions corresponding to the menu button can be performed.

Figure 17:
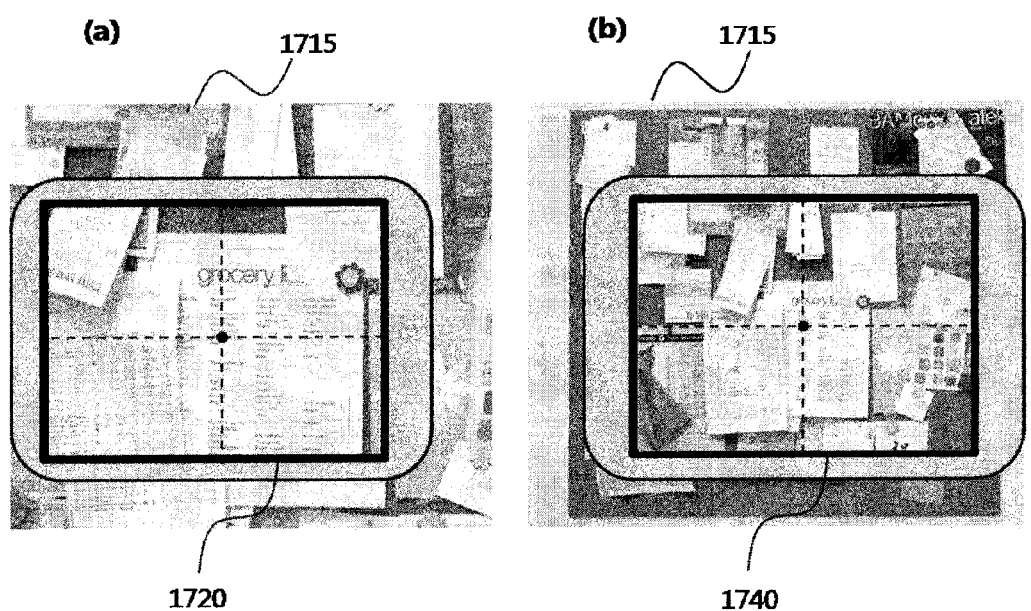
FIG. 17 illustrates front views of display devices displaying images when the display device moves forward and backward.

FIG. 17 illustrates front views of display devices displaying images when the display device moves forward and backward.

The display screen 1720 illustrated at the left side (a) displays image obtained by the image input module moving forward (i.e., the image input module moves closer to the object) and the display screen 1740 illustrated at the right side (b) displays image obtained by the image input module moving backward (i.e., the image input module moves away from the object). As with the previous explanations that the display device of the interface system should not be construed as necessarily displaying merely images obtained by the image input module, ordinary skilled in the art can understand that the display device of the interface system in accordance with the invention is not limited by this embodiment as one displaying merely menu buttons.

It is known from FIG. 17 that the same object 1715 can be differently displayed by the display device according to the invention as the image input module moves forward or backward.

Figure 18:
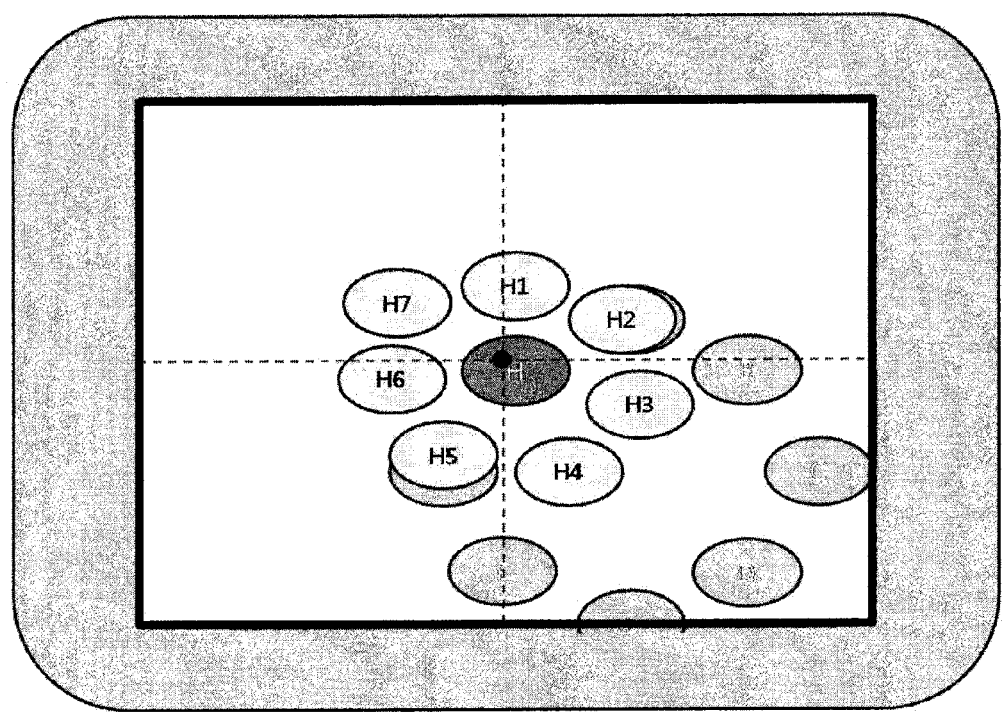
FIG. 18 illustrates display device according to one embodiment of the invention displaying menu buttons and lower level menu buttons.

FIG. 18 illustrates display device according to one embodiment of the invention displaying menu buttons and lower level menu buttons.

As illustrated in FIGS. 15 to 17, the interface system in accordance with the invention can be implemented such that enlargement (or abridgment) of the image beyond the predetermined proportion is recognized as instructions like mouse click when the image input module moves closer to the object (or moves away from the object depending on initial set up) while pointing means such as the center point of the display screen, mouse pointer, etc. is above a certain menu button as a result of the movement of the pointing means (e.g., center point) onto the certain menu button depending on the parallel movement of the image input module (e.g., while the center point of the display screen is above 'H' menu button as a result of the movement of the center point from somewhere around the menu buttons onto the 'H' menu button depending on the parallel movement of the image input module). As one example of functions assigned to the 'H' menu button, it is possible to set up the interface system such that lower level menu buttons 'H1'~'H7' of the 'H' menu button are displayed as illustrated in FIG. 18.

Although it is not illustrated, ordinary skilled in the art can understand from this specification that it is possible to make functions assigned to the lower level menu buttons be performed by making the pointing means such as the center point of the display screen indicate one of the lower level menu buttons (e.g., 'H1'~'H7') and then moving the image input module closer to the object within the predetermined distance or away from the object beyond the predetermined distance.

The interface system using detection of changes in background of images in accordance with the invention can be employed in various wired/wireless devices equipped with all types of image input module that can be conceived at the time of filing this application (e.g., mobile communication terminal, handheld game console, portable media player, handheld PC, control panel, etc.). Further, the display device and the background changes detecting device can be implemented as separate devices in communication with each other in a wireless or wired way. Alternatively, the image input module can be incorporated into the display device while accumulated values obtaining module, pairs obtaining module and Hough transformation module of the background changes detecting device can be implemented as single device. At this time, the image input module and the display device can be implemented as single mobile device and the accumulated values obtaining module, pairs obtaining module and Hough transformation module can be implemented as components of desktop computer, laptop computer, work station, or any type of computing means comprising microprocessor. Alternatively, the background changes detecting device can be implemented as mobile device and the display device can be implemented as any one of display means of desktop computer, laptop computer, workstation, or any type of computing means. At this time, the display device and the background changes detecting device can be in communication with each other in a wired or wireless way.

Functions of the components in accordance with the invention can be implemented by software or hardware that can be conceived by the ordinary skilled in the art at the time of filing this application so that specific implementation of each component has not been explained in detail in this specification.

Further, although the components explained in this specification have been explained as separate components, the invention is not limited by the explanation. Accordingly, several components in accordance with the invention can be incorporated and implemented in one component in practice.

It is possible for the method and device for detecting changes in background of images using multiple binary images and Hough transformation to effectively detect movements of image input module. Thus, although there are movements of the image input module as well as movements of moving objects in images, it is possible to effectively track movements of moving objects in images because the method and the device in accordance with the invention can compensate for the changes in background of images caused by the movements of the image input module.

The invention has advantages in that it is possible to effectively handle changes in background of images caused by fanning or zooming operation of camera and thus to allow free inputs of images using portable device.

Further, in accordance with the invention, it is less sensitive to vertical or horizontal movements of the image input module so that device for fixing camera is no longer required. Thus, it is possible to reduce manufacturing cost regarding the device for fixing camera and to make whole device lighter.

Further, in accordance with the invention, it is possible to provide new concept interface system using changes in background of images replacing the existing means for entering instructions. Thus, the invention has advantages that it is possible to make products smaller and simpler.

Further, by the interface system using detection of changes in background of images, it is possible to make input interface system of various devices simple so that it is possible to reduce the number of operating keys outside and prevent adhesion of foreign substance or scratches on display screen caused by contacts of fingers or stylus when operating existing touch screen device and resulting degradation of display quality.

The hardware devices described above can be configured as one or more software module to execute the operation of the invention, and vice versa.

While the invention has been shown and described with respect to the preferred embodiments, it will be understood by those skilled in the art that various changes and modification may be made without departing from the spirit and scope of the invention as defined in the following claims.

What is claimed is:

1. A device for detecting changes in background of images using multiple binary images thereof and Hough transformation, comprising:
   image input module for receiving successive inputs of gray scale images;
   accumulated values obtaining module for separating both previous image $I_{k-1}$ and current image $I_k$ inputted through the image input module into same number of binary images, counting the number of pixels having pixel values within certain range of pixel values, said range of pixel values being respectively assigned to each binary image, and obtaining vertically accumulated values $h_j^V(I_{k-1})$, $h_{j'}^V(I_k)$ and horizontally accumulated values $h_i^H(I_{k-1})$, $h_{i'}^H(I_k)$, said vertically accumulated values $h_j^V(I_{k-1})$, $h_{j'}^V(I_k)$ representing the total number of the counted pixels in each column of the previous image $I_{k-1}$ and current image $I_k$, said horizontally accumulated values $h_i^H(I_{k-1})$, $h_{i'}^H(I_k)$ representing the total number of the counted pixels in each row of the previous image $I_{k-1}$ and current image $I_k$;
   pairs obtaining module for determining effective pairs of rows (i, i') of the previous image $I_{k-1}$ and current image $I_k$ and effective pairs of columns (j, j') of the previous image $I_{k-1}$ and current image $I_k$ on the basis of the accumulated values obtained by the accumulated values obtaining module; and
   Hough transformation module for transforming the effective pairs using Hough transformation and determining peak values $\rho^V$, $\theta^V$, $\rho^H$, $\theta^H$,
   wherein changes in background of images are detected from the peak values $\rho^V$, $\theta^V$, $\rho^H$, $\theta^H$.

2. The device according to claim 1, wherein the detected changes in background of images are determined by $a_{11}$, $a_{22}$, $b_1$, $b_2$ of the following equation:

$$A\begin{pmatrix}x\\y\end{pmatrix} + B = \begin{pmatrix}x'\\y'\end{pmatrix},$$

-continued $$A = \begin{pmatrix}a_{11} & 0\\0 & a_{22}\end{pmatrix}$$

$$B = \begin{pmatrix}b_1\\b_2\end{pmatrix}$$

$$a_{11} > 0, a_{22} > 0$$

Where (x, y) denotes a point in the previous image $I_{k-1}$ and (x', y') denotes a corresponding point in the current image $I_k$.

3. The device according to claim 1, wherein the accumulated values obtaining module obtains vertically accumulated values $h_j^V(I_{k-1})$, $h_{j'}^V(I_k)$ and horizontally accumulated values $h_i^H(I_{k-1})$, $h_{i'}^H(I_k)$ by counting the total number of pixels having pixel values within a range between $$\frac{255l}{N} \text{ and } \frac{255(l+1)}{N},$$

and wherein N binary images $I_{k-1}^l$, $I_k^l$ ($0 \leq l \leq N-1$) are separated from the previous image $I_{k-1}$ and current image $I_k$.

4. The device according to claim 1, wherein the pairs obtaining module determines pairs of rows (i, i') and pairs of columns (j, j') satisfying the conditions below as effective pairs of rows (i, i') and the effective pairs of columns (j, j');

$$\left|\frac{h_j^V(I_{k-1}^l) - h_{j'}^V(I_k^l)}{h_j^V(I_{k-1}^l)}\right| < T$$

$$\left|\frac{h_i^H(I_{k-1}^l) - h_{i'}^H(I_k^l)}{h_i^H(I_{k-1}^l)}\right| < T,$$

Where $h_j^V(I_{k-1}^l)$, $h_{j'}^V(I_k^l)$, $h_i^H(I_{k-1}^l)$ and $h_{i'}^H(I_k^l)$ respectively denote the number of pixels having pixel values within the certain range in column j, column j', row i and row i'; $I_{k-1}^l$ and $I_k^l$ respectively denote binary images of the previous image $I_{k-1}$ and current image $I_k$ ($0 \leq l \leq N-1$); and T is a constant.

5. The device according to claim 1, wherein $a_{min}$, a minimum value of $a_{11}$ and $a_{22}$, and $a_{max}$, a maximum value of $a_{11}$ and $a_{22}$ can be set up by user and the Hough transformation module performs Hough transformation in a range of $\theta$ as follows:

$$a\tan\left(-\frac{1}{a_{min}}\right) \leq \theta \leq a\tan\left(-\frac{1}{a_{max}}\right).$$

6. A method for detecting changes in background of images using multiple binary images thereof and Hough transformation, comprising:
   receiving successive inputs of gray scale images comprising previous image $I_{k-1}$ and current image $I_k$;
   separating both the previous image $I_{k-1}$ and current image $I_k$ into same number of binary images, counting the number of pixels having pixel values within certain range of pixel values, said range of pixel values being respectively assigned to each binary image, and obtaining vertically accumulated values $h_j^V(I_{k-1})$, $h_{j'}^V(I_k)$ and horizontally accumulated values $h_i^H(I_{k-1})$, $h_{i'}^H(I_k)$, said vertically accumulated values $h_j^V(I_{k-1})$, $h_{j'}^V(I_k)$ representing the total number of the counted pixels in each column of the previous image $I_{k-1}$ and current image $I_k$, said horizontally accumulated values $h_i^H(I_{k-1})$, $h_{i'}^H(I_k)$ representing the total number of the counted pixels in each row of the previous image $I_{k-1}$ and current image $I_k$;

obtaining effective pairs of rows (i, i') of the previous image $I_{k-1}$ and current image $I_k$ and effective pairs of columns (j, j') of the previous image $I_{k-1}$ and current image $I_k$ on the basis of the accumulated values; and transforming the effective pairs using Hough transformation and determining peak values $\rho^V, \theta^V, \rho^H, \theta^H$, wherein the changes in background of the images are detected from the peak values $\rho^V, \theta^V, \rho^H, \theta^H$.

7. The method according to claim 6, wherein the detected changes in background of images are determined by $a_{11}, a_{22}, b_1, b_2$ of the following equation:

$$A\begin{pmatrix}x\\y\end{pmatrix} + B = \begin{pmatrix}x'\\y'\end{pmatrix},$$

$$A = \begin{pmatrix}a_{11} & 0\\ 0 & a_{22}\end{pmatrix}$$

$$B = \begin{pmatrix}b_1\\b_2\end{pmatrix}$$

$$a_{11} > 0, a_{22} > 0$$

Where (x, y) denotes a point in the previous image $I_{k-1}$ and (x', y') denotes a corresponding point in the current image $I_k$.

8. The method according to claim 6, wherein N binary images $I_{k-1}^l, I_k^l$ ($0 \leq l \leq N-1$) are separated from both the previous image $I_{k-1}$ and current image $I_k$, and the vertically accumulated values $h_j^V(I_{k-1}), h_{j'}^V(I_k)$ and horizontally accumulated values $h_i^H(I_{k-1}), h_{i'}^H(I_k)$ are obtained by counting the total number of pixels having pixel values within a range between $$\frac{255l}{N} \text{ and } \frac{255(l+1)}{N},$$

9. The method according to claim 6, wherein the pairs obtaining module determines pairs of rows (i, i') and pairs of columns (j, j') satisfying the conditions below as effective pairs of rows (i, i') and the effective pairs of columns (j, j');

$$\left|\frac{h_j^V(I_{k-1}^l) - h_{j'}^V(I_k^l)}{h_j^V(I_{k-1}^l)}\right| < T$$

$$\left|\frac{h_i^H(I_{k-1}^l) - h_{i'}^H(I_k^l)}{h_i^H(I_{k-1}^l)}\right| < T,$$

Where $h_j^V(I_{k-1}^l), h_{j'}^V(I_k^l), h_i^H(I_{k-1}^l)$ and $h_{i'}^H(I_k^l)$ respectively denote the number of pixels having pixel values within the certain range in column j, column j', row i and row i'; $I_{k-1}^l$ and $I_k^l$ respectively denote binary images of the previous image $I_{k-1}$ and current image $I_k$ ($0 \leq l \leq N-1$); and T is a constant.

10. The method according to claim 6, wherein $a_{min}$, a minimum value of $a_{11}$ and $a_{22}$, and $a_{max}$, a maximum value of $a_{11}$ and $a_{22}$ can be set up by user and the Hough transformation module performs Hough transformation in a range of $\theta$ as follows:

$$a\tan\left(-\frac{1}{a_{min}}\right) \leq \theta \leq a\tan\left(-\frac{1}{a_{max}}\right).$$

11. An interface system using detection of changes in background of successive images, background changes detecting device for detecting changes in background of gray scale images using binary images of the gray scale images, said gray scale images being inputted successively in time; and display device, in communication with the background changes detecting device, for displaying images for implementing interface mechanism, wherein the display device comprises:

display window for displaying images comprising images of menu buttons for implementing the interface mechanism;

pointing means, displayed by the display window, for indicating certain menu button in the displayed images; and controlling module for receiving the detected changes in background from the background changes detecting device, controlling the pointing means to move in real time in proportion to the detected changes in background, and controlling functions assigned to a certain menu to be performed if, with the pointing means indicating the certain menu, the current image is enlarged or abridged from the previous image beyond predetermined proportion;

wherein the display device further comprises: image input module for receiving successive inputs of gray scale images, wherein the background changes detecting device, in communication with the display device, comprises:

accumulated values obtaining module for separating both previous image $I_{k-1}$ and current image $I_k$ inputted through the image input module into same number of binary images, counting the number of pixels having pixel values within certain range of pixel values, said range of pixel values being respectively assigned to each binary image, and obtaining vertically accumulated values $h_j^V(I_{k-1}), h_{j'}^V(I_k)$ and horizontally accumulted values $h_i^H(I_{k-1}), h_{j'}^H(I_k)$ said vertically accumulated values $h_j^V(I_{k-1}), h_{j'}^V(I_k)$ representing the total number of the counted pixels in each column of the previous image $I_{k-1}$ and current image $I_k$, said horizontally accumulated values $h_i^H(I_{k-1}), h_j^H(I_k)$ representing the total number of the counted pixels in each row of the previous image $I_{k-1}$ and current image $I_k$;

pairs obtaining module for determining effective pairs of row (i,i') of the previous image $I_{k-1}$ and current image $I_k$ and effective pair of columns (j, j') of the previous image $I_{k-1}$ and current image $I_k$ on the basis of the accumulated values obtained by the accumulated values obtaining module; and Hough transformation module for transfoming the effective pair using Hough transformation and determining peak values $\rho^V, \theta^V, \rho^H, \theta^H$, wherein changes in backgorund of images are detected from the peak values $\eta^V, \theta^V, \rho^H, \theta^H$.

12. The interface system according to claim 11, wherein the detected changes in background of images are determined by $a_{11}, a_{22}, b_1, b_2$ of the following equation:

$$A\begin{pmatrix}x\\y\end{pmatrix} + B = \begin{pmatrix}x'\\y'\end{pmatrix},$$

$$A = \begin{pmatrix}a_{11} & 0\\ 0 & a_{22}\end{pmatrix}$$

$$B = \begin{pmatrix}b_1\\b_2\end{pmatrix}$$

$$a_{11} > 0, a_{22} > 0$$

Where (x, y) denotes a point in the previous image $I_{k-1}$ and (x', y') denotes a corresponding point in the current image $I_k$.

13. The interface system according to claim 11, wherein N binary images $I_{k-1}^l, I_k^l$ ($0 \leq l \leq N-1$) are separated from both the previous image $I_{k-1}$ and current image $I_k$, and the vertically accumulated values $h_j^V(I_{k-1})$, $h_j^V(I_k)$ and horizontally accumulated values $h_i^H(I_{k-1})$, $h_i^H(I_k)$ are obtained by counting the total number of pixels having pixel values within a range between $$\frac{255l}{N} \text{ and } \frac{255(l+1)}{N}.$$

14. The interface system according to claim 11, wherein the background changes detecting device and the display device are incorporated into one mobile device.

15. The interface system according to claim 11, wherein the display device is a mobile device and the display device is in communication with the background changes detecting device wiredly or wirelessly.

16. The interface system according to claim 11, wherein the display window displays the inputted images of gray scale.

17. An interface system using detection of changes in background of successive images,
background changes detecting device for detecting changes in background of gray scale images using binary images of the gray scale images, said gray scale images being inputted successively in time; and
display, device, in communication with the background changes detecting device, for displaying images for implementing interface mechanism, wherein the display device comprises:
display—window for displaying images comprising images of menu buttons for implementing the interface mechanism;
pointing means displayed by the display window and fixed to indicate a certain point of the display window; and
controlling module for receiving the detected changes in background from the background changes detecting device, controlling the images displayed by the display window to move in real time in proportion to the detected changes in background, and controlling functions assigned to a certain menu to be performed if, with the pointing means indicating the certain menu, the current image is enlarged or abridged from the previous image beyond predetermined proportion;
wherein the display device further comprises: image input module for receiving successive inputs of gray scale images, wherein the background changes detecting device, in communication with the display device, comprises:
accumulated values obtaining module for separating both previous image $I_{k-1}$ and current image $I_k$ inputted through the image input module into same number of binary images, counting the number of pixels having pixel values within certain range of pixel values, said range of pixel values being respectively assigned to each binary image, and obtaining vertically accumulated values $h_j^V(I_{k-1})$, $_j^V(I_k)$ and horizontally accumulted values $h_i^H(I_{k-1})$, $h_j^H(I_k)$, said vertically accumulated values $h_j^V(I_{k-1})$, $h_j^V(I_k)$ representing the total number of the counted pixels in each column of the previous image $I_{k-1}$ and current image $I_k$, said horizontally accumulated values $h_i^H(I_{k-1})$, $h_j^H(I_k)$ representing the total number of the counted pixels in each row of the previous image $I_{k-1}$ and current image $I_k$;
pairs obtaining module for determining effective pairs of row (i,i') of the previous image $I_{k-1}$ and current image $I_k$ and effective pair of columns (j, j') of the previous image $I_{k-1}$ and current image $I_k$ on the basis of the accumulated values obtained by the accumulated values obtaining module; and
Hough transformation module for transfoming the effective pair using Hough transformation and determining peak values $\rho^V, \theta^V, \rho^H, \theta^H$,
wherein changes in backgorund of images are detected from the peak values $\eta^V, \theta^V, \rho^H, \theta^H$.

18. The interface system according to claim 17, wherein the detected changes in background of images are determined by $a_{11}, a_{22}, b_1, b_2$ of the following equation:

$$A \begin{pmatrix} x \\ y \end{pmatrix} + B = \begin{pmatrix} x' \\ y' \end{pmatrix},$$

$$A = \begin{pmatrix} a_{11} & 0 \\ 0 & a_{22} \end{pmatrix}$$

$$B = \begin{pmatrix} b_1 \\ b_2 \end{pmatrix}$$

$$a_{11} > 0, a_{22} > 0$$

Where (x, y) denotes a point in the previous image $I_{k-1}$ and (x', y') denotes a corresponding point in the current image $I_k$.

19. The interface system according to claim 17, wherein N binary images $I_{k-1}^l$, $I_k^l$ ($0 \leq l \leq N-1$) are separated from both the previous image $I_{k-1}$ and current image $I_k$, and the vertically accumulated values $h_j^V(I_{k-1})$, $h_j^V(I_k)$ and horizontally accumulated values $h_i^H(I_{k-1})$, $h_i^H(I_k)$ are obtained by counting the total number of pixels having pixel values within a range between $$\frac{255l}{N} \text{ and } \frac{255(l+1)}{N}.$$

20. The interface system according to claim 17, wherein the background changes detecting device and the display device are incorporated into one mobile device.

21. The interface system according to claim 17, wherein the display device is a mobile device and the display device is in communication with the background changes detecting device wiredly or wirelessly.

22. The interface system according to claim 17, wherein the display window displays the inputted images of gray scale.

* * * * *